United States Patent [19]

Cichanowski

[11] 4,388,669

[45] Jun. 14, 1983

[54] POLYGLYCOL DIELECTRIC CAPACITOR FLUID

[75] Inventor: Stanley W. Cichanowski, Bennington, Vt.

[73] Assignee: General Electric Company, Schenectady, N.Y.

[21] Appl. No.: 235,810

[22] Filed: Feb. 19, 1981

[51] Int. Cl.³ .............................................. H01G 4/22
[52] U.S. Cl. .................................. 361/319; 174/25 C; 252/578; 252/581; 361/273; 361/314; 361/315
[58] Field of Search .............. 361/314, 315, 327, 273, 361/319; 252/572, 576, 578, 580, 581; 174/25 C

[56] References Cited

U.S. PATENT DOCUMENTS 1,986,651 7/1933 Prutton ................................ 252/581
2,253,506 8/1941 Clark ................................ 252/578 X
2,930,954 3/1960 Kalstein ............................. 361/315
4,243,708 1/1981 Eustance ........................ 361/314 X

FOREIGN PATENT DOCUMENTS 147086 6/1952 Australia ............................ 361/315

OTHER PUBLICATIONS

Tomago et al., Development of Oil-Impregnated, All-Polypropylene-Film Capacitor, IEEE Trans. Electr. Insul., vol. E1-12 #4 Aug. 1977, pp. 293-300.

Primary Examiner—R. R. Kucia
Attorney, Agent, or Firm—Arthur E. Bahr; James J. Lichiello; Ernest F. Chapman

[57] ABSTRACT

Polypropylene glycol dielectric fluids are used to impregnate electrical capacitors and particularly metallized capacitors for improved performance.

23 Claims, 5 Drawing Figures

POLYGLYCOL DIELECTRIC CAPACITOR FLUID

BACKGROUND OF THE INVENTION

This invention relates to polyglycol dielectric fluids for use in electrical devices, and more particularly to polypropylene glycol fluids for use as a dielectric fluid in metallized electrical capacitors.

DESCRIPTION OF THE PRIOR ART

Liquid impregnants for electrical capacitors should have a high dielectric constant, maintain a low dissipation factor, and be compatible with the other materials in the capacitor structure. At the same time, the impregnants must withstand elevated and fluctuating temperature, pressure, and voltage stress conditions with excellent electrical characteristics for a long operative life of the capacitor. Ease of processing, impregnating and other such physical characteristics are also much desired.

There are a great number of different kinds of dielectric liquid impregnated capacitors which have been developed over the years to meet specific application requirements. Broadly speaking, among the larger capacitors are found high voltage (above 660 volts AC), and low voltage power capacitors, which also may be denoted as energy storage capacitors, induction heating capacitors, and power factor correction capacitors. Small capacitors are usually found in application categories as motor start and run capacitors and lighting capacitors.

In some instances different capacitors use different fluids although there are common desirable fluid characteristics as well as common capacitor operating environmental characteristics such as vacuum dried fluid filled and sealed units. With the advent of small capacitors where the solid dielectric is under very high electrical stresses, and particularly where the solid dielectric is a plastic film coated with an evaporated metal layer, i.e., a metallized capacitor, the prior fluids used have been found not to be optimum. For example, in some capacitors it is either not necessary or desirable for the fluid to swell the plastic, or the penetration of the fluid into the plastic dielectric is undesirable. In yet other metallized capacitors there is a deleterious relationship between the fluid and the metallized layer which contributes to deficiencies such as electrode degradation and corrosion, and a resultant capacitance loss in the capacitor. These problems in metallized capacitors have led to a search for new and improved dielectric fluids and specialty dielectric fluids for metallized capacitors.

SUMMARY OF THE INVENTION

It has been discovered that a certain class of fluids known as the polyglycols have certain desirable characteristics which, when properly treated and used, will mitigate the foregoing electrode problems. Electrical capacitors utilizing metallized polypropylene films, when impregnated with polypropylene glycol demonstrate superior performance in resistance to electrode corrosion and electrode clearing effects.

THE DRAWINGS

This invention will be better understood when taken in connection with the following description and drawings in which FIG. 1 is an illustration of a metallized polypropylene capacitor roll most adaptable for utilizing the glycol fluid of this invention.

DESCRIPTION OF PREFERRED EMBODIMENTS

Figure 1:
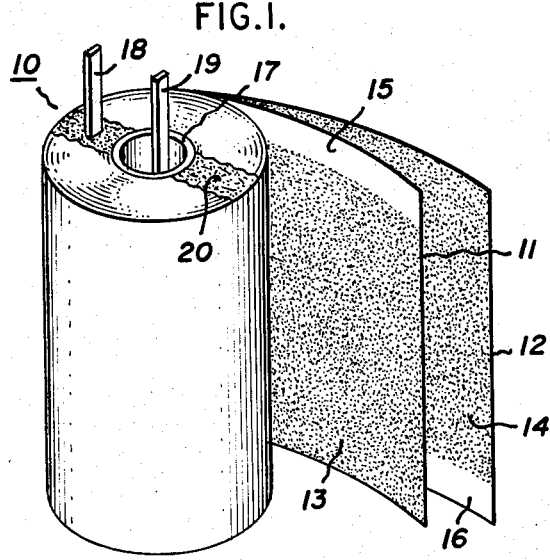

The polyglycol components of this invention are essentially linear polymers having the following generalized formula where R, R' and R" can be hydrogen and/or an alkyl group.

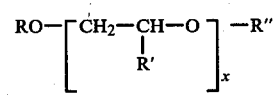

(See Synthetic Lubricants, Edited by Gunderson & Hart, Reinhold Publishing Corporation, New York, N.Y., 1962, Chapter 3, Polyglycols, Pages 61–102, and Encyclopedia of Polymer Science and Technology, Vol. 6, 1967, John Wiley & Sons, Library of Congress Card #6422188, which are incorporated by reference herein.)

These materials have, at various times, also been called glycols, polyethers, polyalkylene glycols, or polyoxyalkylene glycols. This extensive nomenclature has given rise to the generally accepted term polyglycol whether the actual product is a diol, triol, etc., a monoether, a diether, or an ester. While various polyglycol fluids are applicable to the practice of this invention it has been discovered that the polyglycols having a significant polypropylene component and preferably triol type polypropylene glycols derived from a glycerine base, have provided excellent results in the practice of this invention.

A descriptive formula for a triol type polypropylene glycol fluid of this invention is shown as follows:

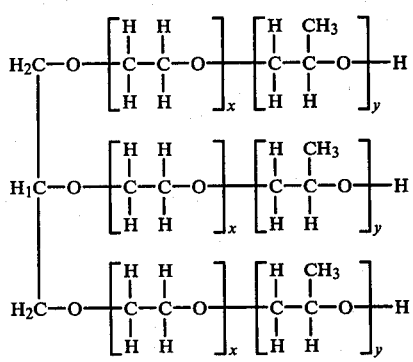

Where X=0 or Y/X is 3–5. The first bracket represents ethylene oxide and the second bracket propylene oxide components.

Among the presently commercially available fluids which have been utilized in this invention are the following:

1. Union Carbide NIAX 16-46—ethylene oxide/polypropylene oxide triol type with a glycerine starter and available from Union Carbide Company.
2. Union Carbide NIAX LG-56—polypropylene oxide triol type with a glycerine starter and available from Union Carbide Company.
3. Dow P2000—polypropylene oxide diol type and available from Dow Chemical Company.
4. Dow 112-2 ethylene oxide/propylene oxide block copolymer and triol type with a glycerine starter and available from Dow Chemical Company.

The molecular weight of the polyglycol fluids of this invention, are above about 1000 and preferably in the range of 3000-4000 and above. Other desirable characteristics are dielectric constants in the range of about 4.5 to 5.5 measured at 100° C., ease of refining to reduce water content below about 75 parts per million (PPM) and a power factor of less than about 10% measured at 100° and 100 Hz.

It has been unexpectedly discovered that polypropylene glycol has unique electrically related properties as a dielectric fluid when used in electrical capacitors where the electrodes are metallized layers on polypropylene film. Also polypropylene glycol has been found to be advantageous as a capacitor fluid in metallized capacitors because its chemical and physical properties are quite adaptable and compatible with polypropylene films. For example, it is a relatively non-spreading, non-penetrating, viscous fluid with low swelling characteristics in polypropylene film. These properties are particularly advantageous in very tightly wound, hard roll, metallized capacitors of the kind disclosed and described in U.S. Pat. No. 3,987,348 Flanagan et al—assigned to the same assignee as the present invention and illustrated in FIGS. 1 and 2 of this invention.

Figure 2:
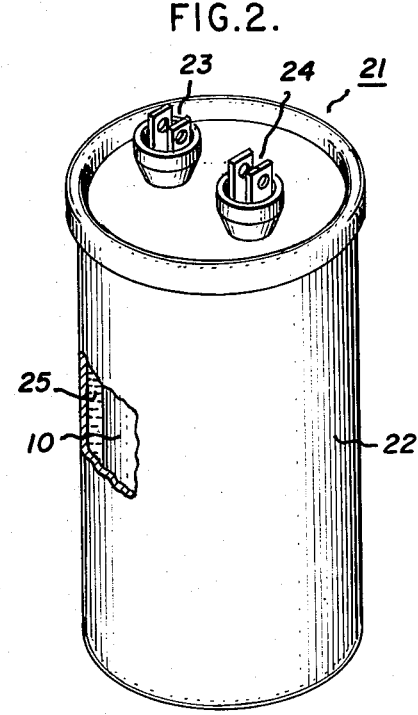
FIG. 2 is an illustration of the capacitor roll section of FIG. 1 assembled in a casing.

Referring now to FIG. 1 there is disclosed one preferred embodiment of this invention as a capacitor roll section 10. Roll section 10 comprises a pair of dielectric material strips 11 and 12 of polypropylene which have been metallized as illustrated by aluminum metallizing surfaces or coatings 13 and 14. As is the usual practice, the strips 11 and 12 are metallized in a manner which leaves metal free margins 15 and 16 along opposite edges of roll 10. In the winding process the roll 10 is wound on a core member 17, and the strips 11 and 12 are laterally offset with respect to each other in order that each roll edge or end will display an offset with its metallized coatings exposed at the edge of the strip. Thereafter, suitable electrical leads 18 and 19 may be attached to the exposed metal coating through utilization of the well-known schooping process to provide a metal layer 20, and the roll 10 is then placed in a can or casing as illustrated in FIG. 2. In FIG. 2, the capacitor 21 includes a casing or can 22 which contains a single roll 10, and the leads 18 and 19 from the roll connect to the terminals 23 and 24. Casing 22 is filled with a dielectric fluid 25 such as a polyglycol fluid of this invention and then sealed.

When the capacitor of FIG. 1 is impregnated with prior fluids, and operated at high voltage, corona discharge occurs at the roll end or edges and also in the first few turns of the roll. It is in these areas where most corona occurs and from which most capacitors fail. But for the fact that a metallized capacitor has inherent clearing effects the corona discharge would cause an early failure of the capacitor. The clearing effect is also known as self-healing and occurs when there is some electrical discharge between metallized electrode layers. The heat of the electrical arc or discharge vaporizes an increasingly larger area of the metallized layer, thus increasing the arc length until it extinguishes. Alternatively described, should a dielectric fault and puncture occur, the very thin film of metallizing will burn back and away from the failure site, isolating the fault. The self-healing feature will then permit the capacitor to continue to function following the clearing, and the dielectric system can be used at voltage stress levels higher than conventional unmetallized capacitors. Clearing is therefore an instrumental factor in preventing early failure of a metallized capacitor. However, repetitive clearings, which have been described, remove some of the electrode area and accordingly reduce the rated capacitance of the capacitor. This is a major disadvantage in metallized capacitors and a limitation on their applications.

It has been discovered that polypropylene glycol fluids act to suppress clearing in the favorable sense of localizing the clearing and not contributing excessive gases and arcing products which would preserve or extend the clearing action and cause excessive evaporation of the electrode metal. This major clearing advantage of polypropylene glycol fluids is evidenced by its reaction to the many minor electrical clearing effects which take place in metallized capacitors. Polypropylene glycol has a high oxygen content which is a favorable factor in the ability of an aluminum metallized layer to clear without the build up of conductive elemental carbon. This build up, which is typical of metallized dielectric systems contributes to maintaining the arc during clearing, with the adverse result of excessive electrode evaporation, loss of capacitance and the development of a high resistance short circuit.

In a liquid filled tightly wound capacitor as described, it is not desirable to have any liquid penetrate significantly into the roll. It is therefore desirable to limit liquid penetration to the roll edges where significant corona may occur. The presence of a high dielectric constant fluid such as polyglycol is additionally favorable at the roll edge. In fact, the rolls are very tightly wound and given a prebaking treatment at elevated temperatures to heat shrink the roll. In these capacitors, if the liquid penetrates and swells the resin it will cause the metallized layer to lose its bond to the resin. The layer then rapidly deteriorates in those areas. Further, the presence of the liquid deeper into the roll interacts in the electrical field to further cause corrosion of the metal layer. Electrode corrosion is also a significant factor in the loss of capacitance in a metallized capacitor. The physical characteristics of polyglycol fluids in these capacitors, i.e. their high viscosity and low swelling with respect to polypropylene film, made them highly desirable dielectric fluids for metallized capacitors.

The loss of capacitance due to the two factors of clearing and corrosion is at present the most serious disadvantage in metallized capacitors and a limiting factor on their useful life The following examples show the benefits, in this respect, from the use of polyglycol fluids of this invention in metallized capacitors.

EXAMPLE I

In this example six identical aluminum metallized capacitors generally following the Flanagan patent disclosure were assembled and impregnated with different capacitor fluids as shown. Severe tests were carried out at 410 VAC and 470 VAC (volts alternating current) at the temperature noted. Ordinarily these capacitors would be rated at 330 VAC and 90° C. and 370 VAC, 70° C. respectively. Measurements were made as the units were thermal cycled to 100° C. and 80° C. respectively. %ΔC is the percent net change in capacitance. F is a capacitor failure. Geconol is a fluid used in the commercial production of other capacitors, and comprises di-ethyl hexyl phthalate ester, an epoxide and Ionol. A further description of this fluid is found in U.S. Pat. No. 3,754,173-Eustance, assigned to the same assignee as the present invention. Ionol refers to a commercially available anti-oxidant comprising 2.6 di tert-butyl-p-cresol and its capacitor use is described in U.S. Pat. No. 4,117,579-Shaw, et al. Polypropylene glycol (PPG) was commercially available as Union Carbide NIAX 16-46. In this example, the polypropylene glycol was first column refined with fuller's earth until the water content was reduced to below about 100 PPM and the power factor, measured at room temperature was below about 10.0%. Test results are given in the following tables:

| Fluid | 410 Volts AC %ΔC After Time T. In Hours | | | | 470 Volts AC %ΔC After Time T. In Hours | | | |
|---|---|---|---|---|---|---|---|---|
| | 300 | 500 | 800 | 1600 | 300 | 500 | 1000 | 1500 |
| PPG NIAX 16-46 | | | 2.6 | 7.4 | | 2.1 | 3.9 | 5.7 |
| Cotton Seed Oil +0.05% Ionol | | | A11-F | | | 2.7 | 7.0 | 11.7 |
| Corn Oil +0.05% | | | A11-F | | | 2.7 | 6.0 | 8.6 2F |
| Geconol | | | 24.6 5-F | A11-F | | 3.3 | 10.1 | 16.8 2-F |
| Epoxidized Soybean Oil | 0.30 | 1.3 | — | 5.2 | 0.7 | 2.2 | 4.1 | — |
| Soybean Oil | 0.6 | 2.8 3-F | — | F | 0.6 | 2.4 | 5.9 | |
| Acetylated Castor Oil | A11-F | | | | 0.6 | 2.0 1-F | 5.1 5-F | |

As can be seen from the above table the %ΔC change in capacitance for the polypropylene glycol impregnated capacitors is consistently and markedly less than the %ΔC change associated with the other fluids. Note the average percent ΔC for the 410 volt unit was 0.5 as compared to 1.3 and 7.4 for the other fluids. Translated into more practical terms this reduction may mean as much as 2 to 3 times the predicted operating life of this capacitor, compared to a Geconol impregnated capacitor.

EXAMPLE II

In this example a number of similar capacitors were made up and subjected to an applied voltage of 400 VAC which is correlated to the capacitor design to produce immediate and positive clearings and clearing times were compared. Clearing time is the number of micro seconds μs, over which the electrical discharge from a clearing extends, PXE is phenyl xylyl ethane and MO is mineral oil, mJ is milli joules.

| Fluid | Applied Voltage 400 VAC | | | | |
|---|---|---|---|---|---|
| | Dry | PPG | GEC | PXE | MO |
| Clearing Time μ sec. | 9 | 8 | 10 | 14 | 12 |

| Fluid | Applied Voltage 400 VAC | | | | |
|---|---|---|---|---|---|
| | Dry | PPG | GEC | PXE | MO |
| Energy mJ | 440 | 380 | 360 | 380 | 360 |

This table shows that PPG has a shorter clearing time than the other fluids. Microscopic examination of clearing sites showed a cleaner clearing for PPG. It is believed the high oxygen content of PPG is a contributing factor to the shorter clearing times.

EXAMPLE III

Tests were undertaken to compare the physical properties of polypropylene glycol (PPG) and Di ethylhexyl phthalate capacitor fluid DEHP, a widely utilized fluid, with the results showing polypropylene glycol to be superior. For example, a physical analysis of DEHP impregnated capacitor rolls and polypropylene glycol impregnated capacitor rolls showed that fluid penetration with polypropylene glycol was significantly less than that of DEHP. Note the following comparison characteristics which support the results of these examinations.

| | 100° Swelling Of PP Vol. % | Contact Angle Of Fluid On Untreated Polypropylene (Degrees) | Viscosity 25° C. |
|---|---|---|---|
| PPG | <1% | 43° ± 2° | 525 cs |
| DEHP | 7.2% | 19° ± 2° | 57 cp |

Figure 3:
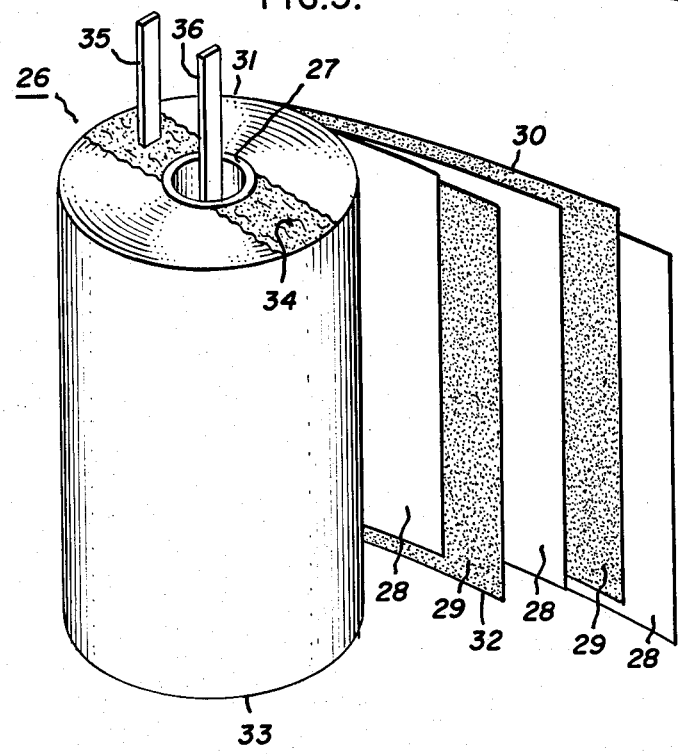
FIG. 3 is an illustration of a different metallized capacitor which is adaptable for the use of the fluid of the invention.

The described advantages of the polyglycol fluids are primarily useable to their best advantage in metallized synthetic resin capacitors. They may also be used in metallized capacitors requiring full impregnation, i.e. double metallized paper electrode polypropylene film dielectric capacitors, composite dielectrics of paper and polypropylene film with aluminum foil electrodes, and all polypropylene film dielectrics with aluminum foil electrodes. These capacitors are described as follows:

Referring now to FIG. 3 the exemplary capacitor roll section 26 comprises a core member 27 on which is a tightly wound series of synthetic resin strips 28 and metallized paper electrodes 29. The roll section 26 is wound with the electrodes in offset relationship to each other so that the metallized edges 30 of one electrode are exposed at one end 31 of the roll section and the exposed edges 32 of the other metallized electrode are exposed at the other end 33 of the roll section. A suitable metal such as aluminum or zinc is sprayed at each end of the roll section to form a coating 34 and electrode leads 35 and 36 are joined to coating 34.

The metallized paper electrodes 29 comprise a thin, high density paper strip on which is a layer or coating of aluminum. A number of materials may be employed for the paper including woven and non-woven polymeric material or other porous and wicking materials which will permit the ingress of dielectric fluids therein and therealong. However, in the practice of this invention, capacitor tissue is preferred which is about 1.0 density. Such tissue is commercially available as Kraft capacitor tissue. The paper strips are coated with a metal layer on both sides thereof, a combination referred to as doubly metallized paper. Preferably the metal is aluminum which is vacuum deposited on the paper by well-known vacuum deposition to provide a uniform high purity metal layer. Such layers are measured in terms of their ohms resistance per square of electrode foil and a range for the present invention is from about 4.0 to about 7.0 ohms/square.

The synthetic resin strips 28 may be single or multiple strips of one or more of the more common dielectric resins such as the polyolefins, polycarbonates and polyamines, etc., and homopolymers and copolymers thereof. However, a resin comprising electrical capacitor grade polypropylene is a preferred resin strip for this invention. Capacitor grade polypropylene film is a higher purity, smoother, polypropylene film of enhanced dielectric characteristics.

The polypropylene strips 28 and metallized paper electrode strips 29 are wound together in roll form as illustrated in FIG. 1, inserted in a round can similar to can 19 of FIG. 2, subjected to an elevated temperature and a vacuum drying process to remove moisture, and vacuum impregnated with a suitable polypropylene glycol fluid 25 of this invention. In the practice of this invention the capacitor rolls may be wound or flattened in a somewhat oval section, both configurations being adaptable to polypropylene glycol fluids. Because of the use of paper in this capacitor the polypropylene glycol fluid impregnates the entire roll structure. The advantageous use of polypropylene glycol fluid in the FIG. 3 capacitor is illustrated by the following example.

EXAMPLE IV

In this example a number of identical capacitors were made up following the FIG. 3 structure and impregnated with a 50/50 by volume blend of polypropylene glycol and phenyl xylyl ethane known as PXE dielectric fluid. The capacitors were then subjected to very high AC and DC voltages to test the breakdown strength of polypropylene glycols against the known excellent performance of the 50/50 volume PXE/Geconol blend. The following results were noted:

| Fluid | DC (Kilovolts) Average Of 12 Units | AC (Kilovolts) Average of 13 Units |
|---|---|---|
| PPG/PXE | 3.0 | 2.4 |
| Geconol/PXE | 2.5 | 2.0 |
| Geconol | 3.6 | 2.4 |
| PPG | 4.4 | 3.0 |

The results of the above tests indicate that polypropylene glycol provides all of the good characteristics of known commercially used dielectric fluids while contributing its own compatibility and clearing advantages.

Figure 4:
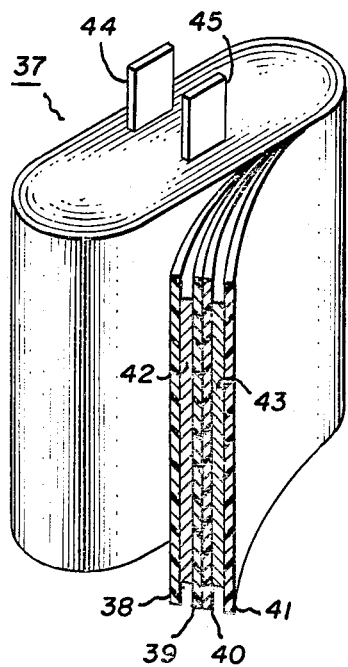
FIG. 4 is an illustration of an all-film dielectric power capacitor adapted to utilize the fluids of this invention.

The polypropylene glycol fluid of this invention may also be employed in other impregnated capacitors such as mixed polypropylene/paper dielectric capacitors as disclosed and claimed in U.S. Pat. No. 3,363,156-Cox, as well as the all-film dielectric capacitor of the same patent. In an all-film capacitor as illustrated in FIG. 4, a longer roll 37 comprises film strip 38, 39, 40 and 41 which are wound together with separate aluminum foil strips 42 and 43 in a roll form similar to roll 10 of FIG. 1 or, a composite dielectric of alternate polypropylene strips and paper strips are wound together with aluminum foil strips in a roll form. An assembled capacitor utilizing the flattened and elongated rolls 37 and electrode leads 44 and 45 is shown in FIG. 5.

Figure 5:
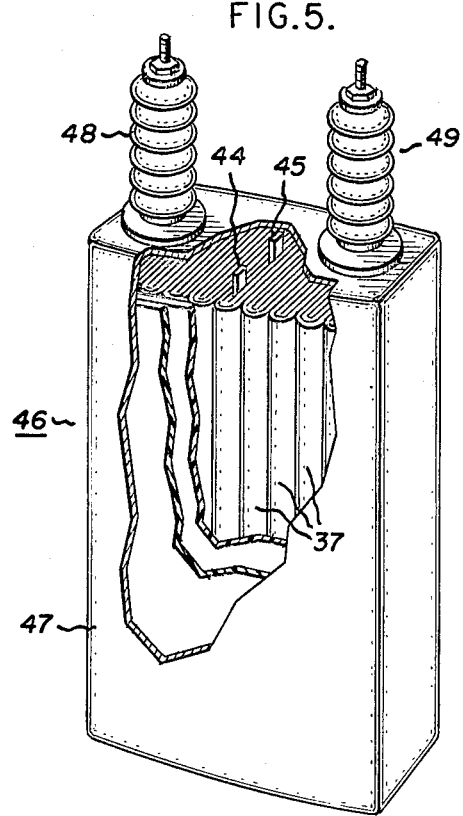
FIG. 5 is an illustration of an assembled capacitor which uses the rolls of FIG. 4 and utilizes the fluids of this invention.

In FIG. 5 capacitor 44 comprises a casing 45 containing a plurality of rolls 37 suitably electrically connected to terminals 46 and 47. Rolls 37 are submerged in polyglycol fluid of this invention. Such a capacitor is denoted as a power capacitor and typically may have a rating of 100–300 Kvar and range upwardly to about 13,000 volts.

Polypropylene glycol may be used alone or with certain additives which have been found beneficial in a capacitor environment. Polypropylene glycol may be subject to oxidation both in the handling and impregnation system or in the capacitor environment. For this reason it is advisable to use an anti-oxidant additive, Ionol being one example. Usually an anti-oxidant is added in amounts ranging from about 0.01% by volume to about 10.0% by volume.

Epoxides have been found to be beneficial in a capacitor environment having either chlorinated fluids or ester fluids present. (See U.S. Pat. Nos. 3,363,156-Cox and 3,754,173-Eustance) for a further description of epoxide use. A typical epoxide which may be used effectively in this invention is commercially available, Unox 221 a dicyclo diepoxy carboxylate. Epoxides are usually added in the range of about 0.1% to 10% by weight of the fluid.

The polypropylene glycols are not considered as aromatic fluids and accordingly are not good gas absorbers. In some capacitor applications gas absorption generally, and often times rapid gas absorption, is necessary to reduce deleterious corona discharge. In this instance certain gas absorbing additives may be used with the polypropylene glycol. One class of additives includes the alkenes such as an aliphatic olefin, tetradecene being a good example. U.S. Pat. No. 4,190,682-Shaw described the use of aliphatics as gas absorbers in combination with ester fluids. A different class of materials, the anthraquinones may also be employed in this invention. Alternatively a polyglycol may be chemically modified to improve its gas absorbency by using starting materials which will provide carbon to carbon double bonds.

Where a preferred fluid would comprise essentially polypropylene glycol (with additives) this fluid may be blended with other fluids to provide special fluids for special needs. The blending of fluids is described for example in a copending application Ser. No. 147031-Grahame. In the Grahame application certain fluids such as Phenyl Xylyl Ethane (PXE) and Mono Iso Propyl Biphenyl (MIPB) are blended with certain esters. For the present invention the polypropylene glycol of this invention may be substituted in place of the ester. It is preferred that the polypropylene glycol be the major constituent in any blend, e.g., that it comprises about one-half or more of volume of the mixture.

Alternatively however, the advantages of the polyglycol may be enhanced or buttressed by chemically modifying or combining other materials therewith. Suitable examples are ether and ester linkages. Included also are copolymers, random or block and polypropylene glycols containing ethylene oxide subunits.

The fluids of this invention are those that remain in the capacitor through its effective life as a fluid as opposed to cured and solid compounds which may contain some combination of polyglycol.

Other fluids tested included Soybean Oil, Acetylated Castor Oil, Soybean Oil, and Polybutene. While in some limited tests, good results were obtained, they were usually obtained at shorter hours of life. Life tests at hours beyond about 1000 clearly show the predominance of the polyglycol fluids of this invention.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What is claimed as new and desired to be secured by Letters Patent of the United States is:

1. An electrical capacitor comprising in combination, a casing, a capacitor roll section in said casing, said roll section comprising in combination, a pair of spaced apart electrodes, a solid dielectric material between said electrodes, means on said casing to connect said electrodes to a source of power, and dielectric fluid in said casing and adjacent said electrodes and solid dielectric, said dielectric fluid comprising a polyglycol fluid having a molecular weight above about 1,000.

2. The capacitor of claim 1 wherein the polyglycol fluid has the general formula

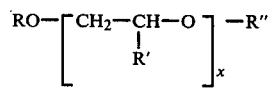

wherein R' is CH$_3$ and/or H, R is alkyl having from 1 to 7 carbon atoms or H and R" is H.

3. The capacitor of claim 2 wherein at least one of said electrodes is a metallized layer on a solid dielectric.

4. The capacitor of claim 3 wherein the fluid comprises polypropylene glycol.

5. The capacitor of claim 3 wherein said polypropylene glycol is a blend with another dielectric fluid.

6. The capacitor of claim 5 wherein said another fluid is a hydrocarbon.

7. The capacitor of claim 3 wherein said metallized layer is on a synthetic resin dielectric.

8. The capacitor of claim 3 wherein said metallized layer is on a paper dielectric.

9. The capacitor of claim 7 wherein said synthetic resin includes polypropylene.

10. The capacitor as recited in claim 7 wherein said synthetic resin comprises all of the solid dielectric between electrodes and said fluid consists essentially of a triol polypropylene glycol.

11. An electrical capacitor comprising in combination:
    (a) a casing;
    (b) a capacitor roll section in said casing;
    (c) said roll section consisting of synthetic resin dielectric strips having a metallized layer on at least one surface thereof;
    (d) means to electrically connect said metallized layer to a terminal on said casing; and
    (e) a dielectric fluid in said casing and in contact with said roll section,
said fluid comprising a polyglycol fluid having a molecular weight above about 1,000.

12. The capacitor as recited in claim 11 wherein said polyglycol fluid comprises polypropylene glycol.

13. The capacitor as recited in claim 12 wherein said polyglycol consists essentially of a triol polypropylene glycol.

14. In an electrical capacitor comprising a pair of spaced strip electrodes and a synthetic resin strip dielectric therebetween to form a laminate which is wound in round roll form and placed in a casing and impregnated with a dielectric fluid and electrical connection means are connected to said electrodes, the combination comprising:
    (a) the said strip electrodes comprising capacitor tissue paper having both sides metallized with a thin layer coating of aluminum or zinc; and
    (b) a dielectric fluid impregnating said roll and paper strips,
said fluid comprising a polyglycol fluid having a molecular weight above about 1,000.

15. The capacitor of claim 14 wherein said polyglycol comprises polypropylene glycol.

16. The capacitor of claim 15 wherein said fluid consists essentially of a triol polypropylene glycol.

17. The capacitor of claim 15 wherein polypropylene glycol is a blend with another fluid.

18. The capacitor of claim 17 wherein said another fluid is an ester.

19. The capacitor of claim 17 wherein said another fluid is a hydrocarbon.

20. An electrical capacitor comprising a combination:
    (a) a casing;
    (b) electrical terminals on said casing;
    (c) a capacitor roll section in said casing;
    (d) said capacitor roll section comprising a synthetic resin dielectric strip and a pair of electrodes therefor, at least one of said electrodes being a separate metal foil which is would with said dielectric strip in roll/form electrical connection means to connect to said electrodes to said terminals;
    (e) and polyglycol dielectric fluid having a molecular weight above about 1,000.

21. The capacitor of claim 20 wherein said fluid comprises polypropylene glycol.

22. The capacitor of claim 20 wherein said fluid consists essentially of a triol polyprolylene glycol.

23. The capacitor of claim 20 wherein both electrodes are separate electrodes and said resin is polypropylene, and said fluid consists essentially of a triol polypropylene glycol.

* * * * *

UNITED STATES PATENT AND TRADEMARK OFFICE
CERTIFICATE OF CORRECTION

PATENT NO. : 4,388,669
DATED : June 14, 1983
INVENTOR(S) : Stanley W. Cichanowski It is certified that error appears in the above—identified patent and that said Letters Patent is hereby corrected as shown below:

In the table at column 5, line 31, under the heading "410 Volts AC %$\Delta$C After Time T. In Hours" under the column designated "300", after "PPG NIAX 16 - 46", insert --0.5--.

In the table at column 5, line 33, under the heading "410 Volts AC %$\Delta$C After Time T. In Hours" under the column designated "300", after "Cotton Seed Oil +0.05% Ionol", insert --1.3--.

In the table at column 5, line 35, under the heading "410 Volts AC %$\Delta$C After Time T. In Hours" under the column designated "300", after "Corn Oil +0.05%", insert --1.3--.

In the table at column 5, line 36, under the heading "410 Volts AC %$\Delta$C After Time T. In Hours" under the column designated "300", after "Geconol", insert --7.4--.

Claim 20, column 10, line 50, delete "would" and substitute therefor --wound--.

Signed and Sealed this

Thirteenth Day of December 1983

[SEAL]

Attest:

GERALD J. MOSSINGHOFF

Attesting Officer  Commissioner of Patents and Trademarks